(12) United States Patent
Schneider et al.

(10) Patent No.: US 8,749,957 B2
(45) Date of Patent: Jun. 10, 2014

(54) DEVICE FOR HOLDING AT LEAST ONE SWITCH IN AN ENCLOSURE, E.G. A SWITCH CABINET

(75) Inventors: Henning Schneider, Schotten (DE); Marc Willius, Ahnatal (DE); Philipp Werb, Niestetal (DE); Ronny Zabel, Malsfeld (DE)

(73) Assignee: SMA Solar Technology AG, Niestetal (DE)

( * ) Notice: Subject to any disclaimer, the term of this patent is extended or adjusted under 35 U.S.C. 154(b) by 363 days.

(21) Appl. No.: 13/184,770

(22) Filed: Jul. 18, 2011

(65) Prior Publication Data
US 2012/0026648 A1 Feb. 2, 2012

(30) Foreign Application Priority Data
Jul. 30, 2010 (DE) ...................... 20 2010 010 884 U

(51) Int. Cl.
*H02B 1/32* (2006.01)
(52) U.S. Cl.
USPC ............ 361/624; 361/648; 361/649; 361/673
(58) Field of Classification Search
USPC .......... 361/608, 628, 634, 363, 652, 656, 673
See application file for complete search history.

(56) References Cited

U.S. PATENT DOCUMENTS

| 5,768,091 | A | * | 6/1998 | Vinson et al. .................. 361/601 |
| 6,122,160 | A | * | 9/2000 | Hannula ....................... 361/600 |
| 7,616,431 | B2 | | 11/2009 | Moore et al. |

FOREIGN PATENT DOCUMENTS

| EP | 0708510 A2 | 4/1996 |
| EP | 1120873 A1 | 8/2001 |

OTHER PUBLICATIONS

German Search Report Dated Mar. 21, 2011 for Application No. DE 202010010884. 10 Pages.

* cited by examiner

*Primary Examiner* — Gregory Thompson
(74) *Attorney, Agent, or Firm* — Eschweiler & Associates, LLC

(57) ABSTRACT

A device for holding at least one switch within an enclosure includes a frame configured to surround at least a portion of the switch. The frame includes a bridge portion extending along a back portion of the switch, and lateral arms extending along respective side portions of the switch. The lateral arms include fastening equipment configured to provide an adjustable retention of the switch in the enclosure. The device may be included in a switch cabinet.

16 Claims, 3 Drawing Sheets

DEVICE FOR HOLDING AT LEAST ONE
SWITCH IN AN ENCLOSURE, E.G. A SWITCH
CABINET

REFERENCE TO RELATED APPLICATION

This application claims priority to German Patent Application No. 20 2010 010884, filed on Jul. 30, 2010.

FIELD

The invention concerns a device for holding at least one switch in an enclosure, e.g. a switch cabinet and an enclosure with such a device.

BACKGROUND

A number of switches are required for cabling a photovoltaic (PV) plant, in particular to connect PV modules to the inverters or the inverters to the grid. Such switches are provided both on the DC side and on the AC side. According to the state-of-the-art, these respective switches must be installed in individual enclosures on both the DC and AC sides. Due to the number of individual enclosures required, more space is needed if the enclosures are either mounted on a wall or installed outdoors as freestanding units. This is a problem in particular if the PV plant is to be supplemented with additional modules. Often enough, there is no longer sufficient space for additional switch cabinets. Therefore, corresponding future space requirements must be incorporated in advance in anticipation of such expansions. Also, the variety of different individual systems requires a range of different connection conditions, which are also highly restricted as the individual switches must be installed in one enclosure each.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

In detail, according to the state-of-the-art, the installation of the switches in a separate assigned enclosure is affected such that the switches are fitted on the rear wall of this enclosure. The size of the enclosure is based on the size of the switch it is to contain.

The particular disadvantage of the current state-of-the-art is the installation of the individual switches in separate enclosures, as the switches mounted on the rear wall must be cabled. Note that these cables are very thick, which means that they require a considerable amount of force to pass them through the corresponding openings in the enclosure walls before they can be connected to the corresponding switch terminals.

Accordingly, the invention is intended to make installation easier.

To solve this problem, it is proposed to devise a device that is surrounded by a frame, in particular a U-shaped frame, whereby the frame has suspensions on the arms for the adjustable mounting onto a retainer mounted in the enclosure. This allows the frame with the switch to be inserted anywhere on the retainer, to be cabled there if necessary and then to be moved to its final position. The frame does not have to be U-shaped—it can also be rectangular.

In one embodiment the bridge of the frame holds the switch, so that the frame and switch are separate component parts. However, in another embodiment the frame can be part of the switch enclosure.

Individually, it is also planned to implement the suspension on the arm as a lug which protrudes from the outer side of the arm. In particular in conjunction with a pair of mounting rails as the retainer, the U-shaped frame can be mounted on the pair of mounting rails using the lugs, the switch mounted on the frame can be cabled anywhere on the pair of mounting rails. The frame with the switch is not moved until cabling is complete, Then after the final position has been determined, the frame is bolted to the pair of mounting rails.

A further embodiment of the invention is that one face of each of the arms of the specific U-shaped frame is made of an electrically insulating material, e.g. fibre-reinforced plastic, for holding at least one connection rail. In particular, the design foresees that the side face of electrically insulating material will have at least one slot, for example, four slots for holding a corresponding number of connection rails, that are electrically connected to the switch. Thus the connection rails are held with mechanical and electrical insulation by the side face. The connection rails can be designed such that they facilitate all standard connections options, e.g. ring terminals, drum terminals etc.

Also, in one embodiment the connection rails are of different lengths, and protrude beyond the side faces to different extents. This makes it clear that the connection rails can be held with a lateral offset from one another by the insulating side face, which also makes installation easier as it improves the accessibility during installation.

The U-shaped frame that holds the switch can be dimensioned in one embodiment such that it allows the frame to hold switches of different sizes. That means that for larger switches, the space between the arms is mostly filled, which may not be the case for a smaller switch.

The U-shape of the frame means that it can hold switches of different sizes, which allows the number of individual parts to be reduced, which has a positive effect on the production costs.

A switch cabinet is also a portion of this invention. It is characterized by the ability to hold at least one of the devices named above. It has already been mentioned that in one embodiment the retainer incorporates two parallel mounting rails. The U-shaped frame, with its lugs on the outer sides of the arms, is mounted on these mounting rails. The mounting rails are attached at an interior portion such as a rear or side wall of the enclosure, in particular in the switch cabinet in one embodiment. However, the mounting rails can also be designed as cantilevers. Furthermore, the invention is characterized by the fact that the mounting rails are long enough to allow multiple devices for holding at least one switch each to be installed in series on the mounting rails. This clearly shows that, by contrast to the current state-of-the-art, these enclosures can accommodate more than one switch, in particular several switches consecutively on a pair of mounting rails, whereby switches of different types and sizes can be installed in one cabinet. In this context, the enclosure could also contain multiple pairs of mounting rails above one another to hold multiple frames above one another, which will each accommodate one switch, whereby the frames installed above one another are held at an offset from one another by the pairs of mounting rails. The offset placement of the frames with the switches in the enclosure improves accessibility for cabling and requires less space. This is because the offset alignment of the devices also allows the cables to be routed with an offset.

Thus, installing multiple switches in a single enclosure, in particular a switch cabinet not only reduces the space required to accommodate the switches, it also allows such switch cabinets to be designed so that they have spare space for installing additional switches, which can be necessary if a PV plant is to be expanded.

In particular, the option of securing the individual switches with the corresponding frame to the pairs of mounting rails after cabling, and the offset alignment of the individual switches with the corresponding frames on the pairs of mounting rails in the depth of the enclosure, and the option of connection rails of different lengths for installation in the side faces made of insulating material, increase the clarity of cabling, which reduces the risk of errors when cabling.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The drawings below provide a more detailed description of the invention.

DETAILED DESCRIPTION

Figure 1:
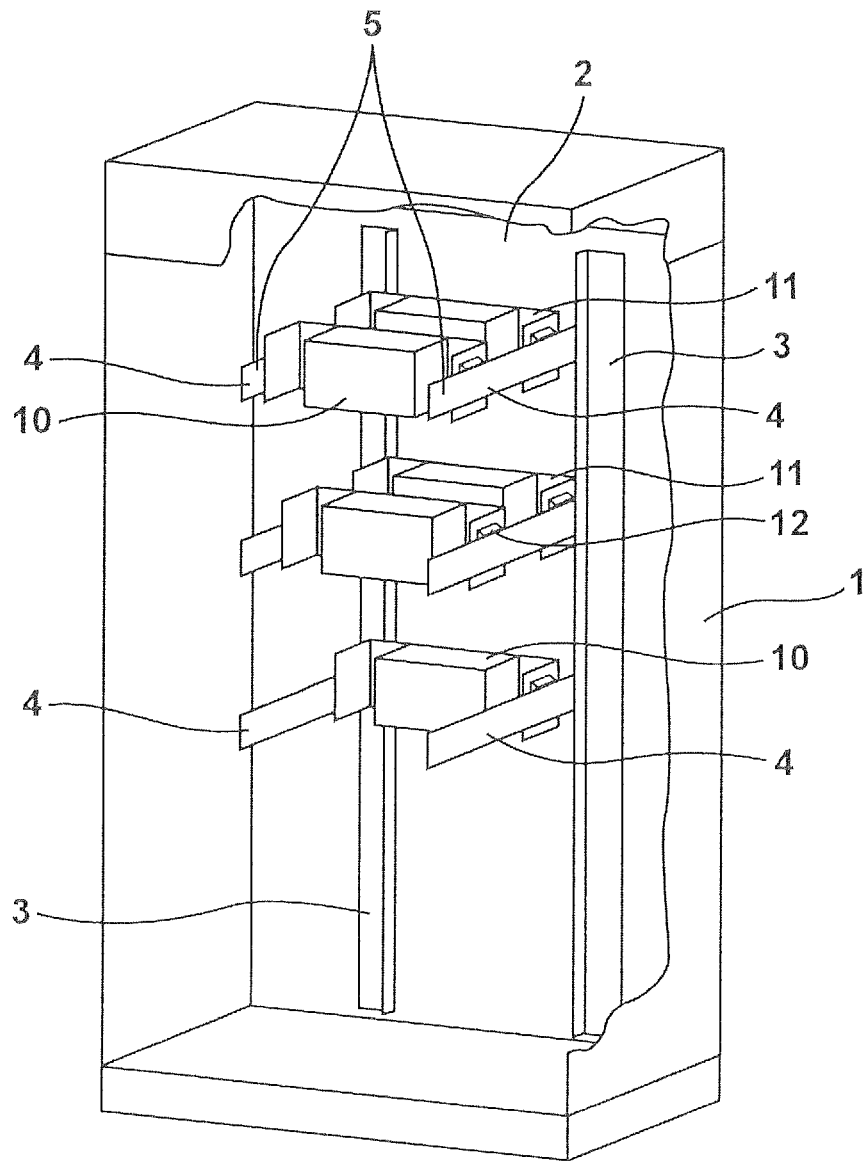
FIG. 1 is a schematic diagram of a switch cabinet for holding multiple switches installed beside and above one another.

FIG. 1 shows the switch cabinet labeled 1, that can also be designed for outdoor use. A rear wall 2 of the switch cabinet holds two supports 3, whereby the supports 3 each hold mounting rails 4 installed above one another, wherein each mounting rail serves to hold the switches 10. The supports 3 themselves can be arranged on a wall or the base and the top of the switch cabinet. Two parallel mounting rails 4 in a plane form a pair of mounting rails 5. The individual mounting rails are either clipped to the vertical support 3 or fastened by screws as cantilevers in a cantilever shelf or to the supports 3. In addition to threaded connections, rivets, welding or gluing are also conceivable. If the wall of the enclosure is designed accordingly, the mounting rails 4 can also be secured directly to the walls.

Figure 2:
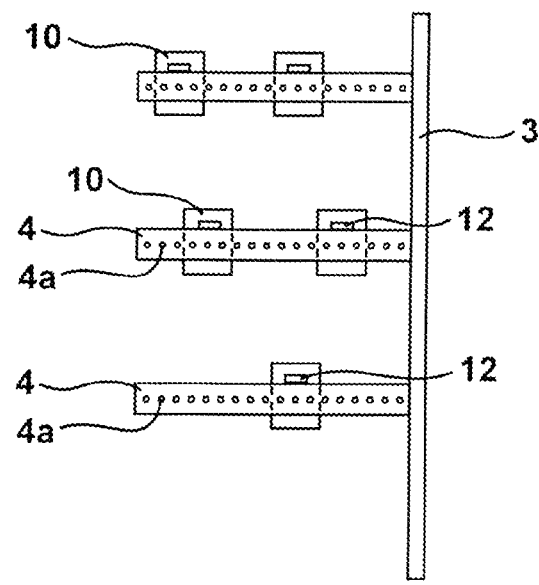
FIG. 2 is a schematic diagram of a side view of the alignment of the switches installed on a U-shaped frame on the mounting rails.
Figure 3:
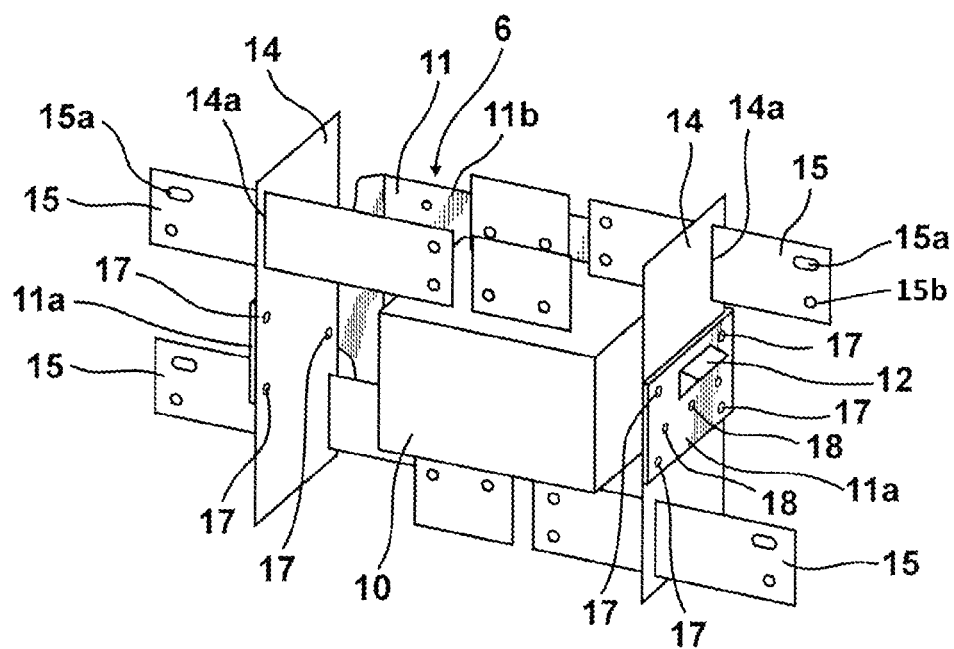
FIG. 3 shows a perspective of the U-shaped frame with the switch.
Figure 4:
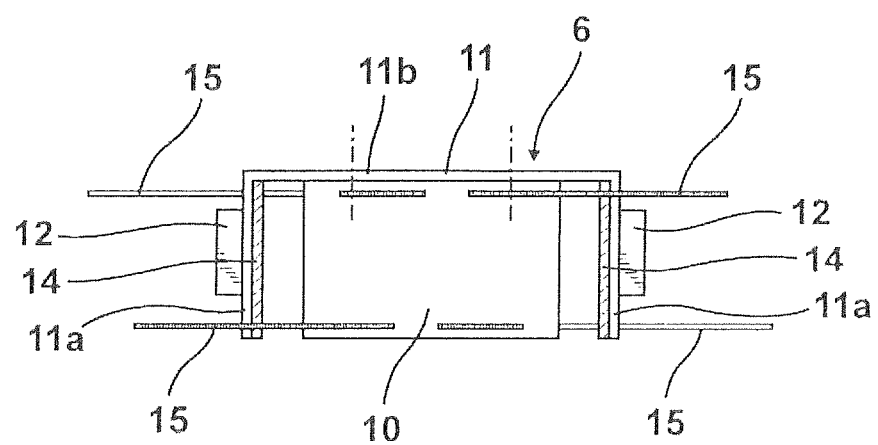
FIG. 4 shows a topview of FIG. 3.

FIGS. 3 and 4 show the design of the the device 6 in accordance with the invention for holding a switch 10. The U-shaped frame 11 of the device 6 shows, in addition to the bridge 11b, to which the switch 10 is fastened, one arm 11a on either side, whereby the arm 11 a features a lug 12 which protrudes to one side. Lug 12 can also be designed as a bend from the arm 11a of the frame 11. The arm 11a comprises a side face 14 made of insulating material. The side face 14 features multiple slots 14a for holding connection rails 15. For example, the side face 14 is fastened to the arm 11a via a threaded connection which is illustrated schematically via the reference number 17. In addition to this, the arm and the electrically insulating side faces, in corresponding positions, contain further holes 18, which serve to fasten the frame 11 via bolts to the mounting rails 4. For this purpose, the mounting rails 4 have a hole pattern 4a, which corresponds to the holes 18 (FIG. 2). FIG. 4 shows particularly clearly that the individual connection rails 15 protrude beyond the side face 14 to different amounts. The connection rails 15 have openings 15a and 15b for connection with cables for example from a DC or AC side of a PV plant; the connection rails 15 are also electrically connected to the respective switch 10.

Considering FIG. 2 again in this context, it is clear that the individual switches 10, which are each held by a frame 11, are held with a lateral offset by the pairs of mounting rails 4. The laterally offset arrangement of the frames with the switches on the pairs of mounting rails 4, as shown in FIG. 2, and the different protrusion of the connection rails 15 beyond the sides of the U-shaped frame or beyond the side face not only makes installation easier in terms of cabling, but also makes the cabling itself clearer. This allows extremely compact enclosures to be designed.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A device for holding at least one switch within an enclosure, comprising:
    a frame configured to surround at least a portion of the switch, the frame comprising:
        a bridge portion extending along a back portion of the switch; and
        lateral arms extending along respective side portions of the switch, the lateral arms comprising fastening equipment configured to provide an adjustable retention of the switch in the enclosure, wherein the lateral arms of the frame comprise side faces, respectively, the side faces comprising an insulating material, wherein one or more connection rails extend through corresponding slots in the side faces.

2. The device of claim 1, wherein the bridge portion and lateral arms of the frame together form a U-shaped bracket surrounding three sides of the switch.

3. The device of claim 2, wherein the bridge portion of the frame is configured to selectively affix the switch thereto.

4. The device of claim 1, wherein the fastening equipment of the lateral arms comprises protruding lugs respectively extending outwardly from the lateral arms opposite the switch, wherein the protruding lugs are configured to mount the device onto a pair of mounting rails within the enclosure.

5. The device of claim 1, wherein a top slot resides within a top portion of the side faces, and a bottom slot resides within a bottom portion of the side faces, a corresponding connection rails extending through each of the slots, wherein extension lengths of the connection rails of the top slot and the bottom slot are different.

6. A switch cabinet enclosure, comprising:
a device configured to hold at least one switch, comprising:
a frame configured to surround at least a portion of the switch, the frame comprising:
a bridge portion extending along a back portion of the switch; and
lateral arms extending along respective side portions of the switch, the lateral arms comprising fastening equipment configured to provide an adjustable retention of the switch in the enclosure, wherein the lateral arms of the frame comprise side faces, respectively, the side faces comprising an insulating material, wherein one or more connection rails extend through corresponding slots in the side faces.

7. The switch cabinet enclosure of claim 6, further comprising a retainer comprising two parallel mounting rails secured to an interior portion of the switch cabinet enclosure, wherein the device is secured to and between the two parallel mounting rails.

8. The switch cabinet enclosure of claim 7, wherein the two parallel mounting rails extend from the interior portion of the switch cabinet enclosure to which the mounting rails are secured, wherein the switch cabinet comprises a first device secured to and between the two parallel mounting rails at a first distance from the interior portion of the switch cabinet enclosure, and wherein the two parallel mounting rails are configured to secure therebetween a second device at a second, different distance from the interior portion of the switch cabinet enclosure.

9. The switch cabinet enclosure of claim 6, further comprising:
a first pair of parallel mounting rails secured to an interior portion of the switch cabinet enclosure, wherein the device comprises a first device secured to and between the first pair of parallel mounting rails; and
a second pair of parallel mounting rails secured to an interior portion of the switch cabinet enclosure below the first pair of parallel mounting rails, wherein a second device is secured to and between the second pair of parallel mounting rails.

10. The switch cabinet enclosure of claim 9, further comprising a pair of parallel supports extending generally vertically along the interior portion of the switch cabinet enclosure and secured thereto, wherein the first and second pairs of parallel mounting rails are secured to the interior portion of the switch cabinet enclosure via the pair of parallel supports, respectively.

11. The switch cabinet enclosure of claim 6, wherein the bridge portion and lateral arms of the frame together form a U-shaped bracket surrounding three sides of the switch.

12. The switch cabinet enclosure of claim 11, wherein the bridge portion of the frame is configured to selectively affix the switch thereto.

13. The switch cabinet enclosure of claim 6, wherein the fastening equipment of the lateral arms comprises protruding lugs respectively extending outwardly from the lateral arms opposite the switch, wherein the protruding lugs are configured to mount the device onto a pair of mounting rails within the enclosure.

14. The switch cabinet enclosure of claim 6, wherein a top slot resides within a top portion of the side faces, and a bottom slot resides in a bottom portion of the side faces, a corresponding connection rail extending through each of the slots, wherein extension lengths of the connection rails of the top slot and the bottom slot are different.

15. A device for holding at least one switch within an enclosure, comprising:
a frame comprising side faces and configured to surround at least a portion of the switch, the side faces comprising an insulating material, wherein one or more connection rails extend through corresponding slots in the side faces; and
wherein:
the frame comprises fastening equipment configured to provide an adjustable retention of the switch in the enclosure, wherein the fastening equipment comprises protruding lugs respectively extending outwardly from lateral arms of the U-shaped bracket opposite the switch, wherein the protruding lugs are configured to mount the device onto a pair of mounting rails within the enclosure, or
a top slot resides within a top portion of the side faces, and a bottom slot resides in a bottom portion of the side faces, a corresponding connection rail extending through each of the slots, wherein extension lengths of the connection rails of the to slot and the bottom slot are different.

16. The device of claim 15, wherein the frame forms a U-shaped bracket surrounding three sides of the switch.

* * * * *